United States Patent [19]

Strinzel et al.

[11] Patent Number: 4,658,665
[45] Date of Patent: Apr. 21, 1987

[54] GEAR INSTALLATION

[75] Inventors: Horst Strinzel; Alfred Seidl, both of Sonthofen, Fed. Rep. of Germany

[73] Assignee: BHS-Bayerische Berg-, Hütten- und Salzwerke Aktiengesellschaft, Munich, Fed. Rep. of Germany

[21] Appl. No.: 473,930

[22] Filed: Mar. 10, 1983

[30] Foreign Application Priority Data

Mar. 16, 1982 [DE] Fed. Rep. of Germany ....... 3209514

[51] Int. Cl.⁴ .............................................. F16H 57/04
[52] U.S. Cl. ...................................... 74/467; 184/6.12
[58] Field of Search ..................... 74/467; 184/6.12, 31

[56] References Cited

U.S. PATENT DOCUMENTS

| 1,132,748 | 3/1915 | Sundh | 74/467 X |
| 1,220,810 | 3/1917 | Alquist | 184/6.12 |
| 1,442,788 | 1/1923 | Scheminger, Jr. | 74/467 X |
| 2,535,703 | 12/1950 | Smith et al. | 184/6.12 |
| 4,169,519 | 10/1979 | Hirt et al. | 184/6.12 X |

FOREIGN PATENT DOCUMENTS 47-25425 7/1972 Japan .................. 184/6.12
708099 4/1959 United Kingdom .
0979767 9/1981 U.S.S.R. .................. 184/31

Primary Examiner—Leslie Braun
Assistant Examiner—Dwight G. Diehl
Attorney, Agent, or Firm—Flynn, Thiel, Boutell & Tanis

[57] ABSTRACT

The invention provides a compact gear installation in which all the necessary auxiliary equipment for pressure lubrication is accommodated within a gear housing. Also, damage to the gear caused by insufficient lubrication during run down or start-up of the gear is avoided. Within the housing, an oil pump pumps lubricating oil from a lower cooled oil reservoir via a filter to an upright oil reservoir. Oil flows out of said upper reservoir via two main pipes, which subsequently interconnect, to lubricate the gear. When the gear is switched off the lower of these pipes is sealed off, e.g. by a valve, but a certain volume of oil can still flow through the upper pipe to lubricate the gear as it slows down. When the gear is started up again, the lower pipe is reopened and the residual volume of oil (below the level of the upper pipe) can flow through this pipe to provide initial lubrication for the gear.

17 Claims, 5 Drawing Figures

GEAR INSTALLATION

FIELD OF THE INVENTION

This invention relates to a gear installation having pressure lubrication.

BACKGROUND OF THE INVENTION

In the case of high power gear installations, particularly those intended for high speed operation, forced or pressure lubricated of the bearings and the toothed wheels is essential. To achieve this, at least one lubricating oil pump is provided in each such installation. This pump is either driven mechanically by the gear installation itself or, for example, by a separate electric motor. Since, in most cases, a fairly large amount of heat is transferred to the lubricating oil, the oil is usually cooled down in a separate oil cooler after emerging from the pump. In the known gear installations, the oil is retained in an oil reservoir which, together with the oil pump and the oil cooler, is housed in a special oil unit which is quite separate from the gear housing.

This conventional arrangement leads to a number of disadvantages where pressure lubrication is required, as will now be discussed.

Prior to start-up and during the acceleration or run-up period lubrication is necessary to preserve a gear from damage. This is particularly important in the case of gears which form part of emergency devices or mechanisms and therefore run only very rarely. During the long periods of disuse the bearings dry out, so that these gears are likely to be considerably damaged if they are started-up without prior lubrication. To provide prior lubrication an electrically-driven pump can be provided, since a pump driven mechanically by the gear itself would not, at that time, be operational. However, as this electrically-driven pump is used only for the start-up, and is not used during normal operation of the gear, it represents an unacceptable additional construction expense.

Gear lubrication points also have to be supplied with sufficient oil during the run-down period of a gear, which run-down or slowing period may be of considerable length. In the case of gears having mechanically positively-driven pumps, supplementary pumps driven by electric motors have to be switched on to provide lubrication during the run-down period as the delivery of the positively-driven pumps fails as soon as the speed drops.

In the case of gears having main pumps driven by electric motors, these pumps have to remain switched on during the run-down period. However, it is important to note that in the case of all known gear installations having pressure lubrication, any damage to the pump or failure of the electrically supply will leave the installation without an oil supply and therefore susceptible to damage.

An object of the present invention is to provide a compact gear installation whereby dry-running upon start-up and run-down of the gear as well as upon failure of the oil-pump may be avoided.

SUMMARY OF THE INVENTION

With this object in view, the invention provides a gear installation having pressure lubrication comprising a cooled oil reservoir, an oil pump, an oil filter and inlet and outlet pipes all disposed inside a gear housing, and a second oil reservoir which is located in the upper region of the housing and connected by way of two main pipes to the gear that is to be lubricated, said two pipes leading from the second reservoir at differing heights and subsequently communicating with each other, and one of said pipes being sealable.

The proposed installation therefore has a compact closed mode of construction similar to that of immersion lubrication gears and the danger of damage as a result of dry running during start-up and run-down of the gear is obviated. Moreover, the entire gear installation is simplified by the abolition of additional mechanism and monitoring instruments.

The second oil reservoir may conveniently be connected to the oil pump by way of an inlet pipe so that the oil pump at all times adequately supplies the second oil reservoir with oil from the first oil reservoir. Also, an additional overflow pipe may be provided leading from an upper region of the second oil reservoir to the gear that is to be lubricated.

Advantageously it is the lower of the two main pipes which is sealable. The sealing of this lower pipe may be effected by a valve actuated, for example, by a solenoid or lifting magnet. Preferably, the switch-on control of the gear first of all opens the valve, for example by means of a solenoid, and then, after a delay period determined by a time relay, switches on the driving motor or other driving machine of which the gear forms a part. With the valve open, oil flows to the appropriate gear bearings both prior to and during the start-up procedure and the gear can be started up without fear of damage. During normal operation the valve remains open.

The invention can be applied to spur gears having axes of rotation which are inclined horizontally, vertically or arbitrarily and also to other toothed wheel systems for example bevel gears.

The invention may also be applied to a gear installation having a planetary gear with a revolving planet wheel carrier in which case oil supply pipes are still connected to the two main pipes leading from the second oil reservoir. Equally, the invention may be applied to an installation including planetary wheel gears having a stationary planet wheel carrier. Furthermore, the possibility exists that, in the case of a planetary gear installation having a revolving planet wheel carrier, the oil supply pipes of the planetary wheel carrier may be connected to the second oil reservoir such that the inlet opening into the rotating planet wheel carrier has a smaller radial spacing with regard to the central axis of the gear than the outlet opening into the planet wheel bearings. In this way centrifugal force may be harnessed to ensure that the planet wheel bearings are adequately supplied with oil.

In a further development of the invention, the gear housing may be provided externally with cooling elements which permit adaptation of the cooling surface so that the required heat loss is achieved. These cooling elements may either be ribs which can be screwed or bolted onto the housing or cooling ribs which are integrally cast with the gear housing. In the case of cast cooling ribs, the cooling rate may be reduced, for example, by cover sheets. Also, with the aid of predetermined separation points, the cooling surface may be adapted by the detachment of ribs.

In a further embodiment the cooling elements may consist of a cooling ventilator mounted outside the housing, and an air circulation hood surrounding said ventilator. In this case the cooling rate may be varied, for example, by adjustment of the ventilator and/or by variation of the air inlet or outlet openings to the required heat loss from the gear. Thus, in a sample manner the invention provides for adjustable and effective cooling of the oil which is present in the gear housing.

BRIEF DESCRIPTION OF THE DRAWINGS

The invention will be described further, by way of example, with reference to the accompanying drawings, in which.

DETAILED DESCRIPTION OF THE INVENTION

Figure 1:
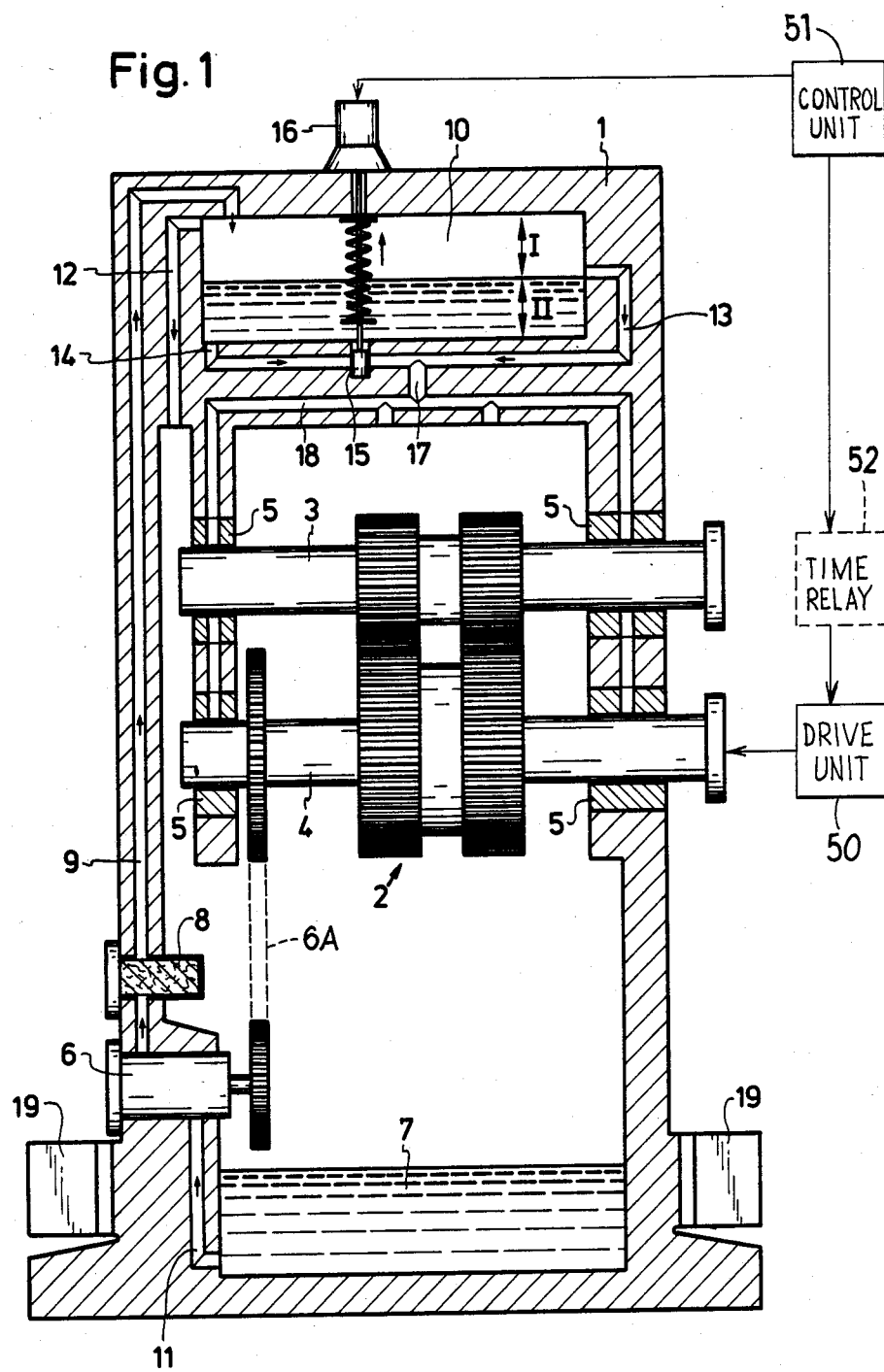
FIG. 1 is a schematic cross-section of a first embodiment of the gear installation of the invention.

A first embodiment of the gear installation having pressure lubrication of the invention is shown in FIG. 1. In this installation, a gear comprising sets of wheels 2 on gear shafts 3 and 4 is mounted inside a gear housing 1. Bearing points 5 of the gear shafts 3, 4 as well as the sets of wheels 2 have to be supplied adequately with oil, and, for this purpose, an oil pump 6 is located in the gear housing. The shaft 4 directly drives the oil pump 6 through a chain 6A which engages gears on the shaft 4 and the drive shaft of the pump 6. This oil pump 6 draws oil, by way of a conduit or pipe 11, from an oil reservoir 7 and conveys said oil by way of a filter 8 and a pipe 9 into a conduit or second oil reservoir 10 which is arranged above the wheel sets 2.

This oil reservoir 10 is connected by way of three pipes or conduits 12, 13, 14 to the space in which the wheel sets 2, the bearings 5 and the gear shafts 3, 4 are arranged. The outlet opening from the reservoir 10 to the pipe 13 lies above the outlet opening to the pipe 14. The pipes 13, 14 are connected together by a pipe 17 which leads by way of a pipe 18 to the individual bearings 5 and to the lubrication points for the wheel sets 2. The pipe 14 is sealable by virtue of a valve 15 and a lifting magnet or solenoid 16.

In the operational state of the gear installation the valve 15 is opened and the second oil reservoir 10 is filled with oil. The lubrication of the individual bearings 5 as well as of the wheel sets 2 is effected by way of the pipes 13 and 14.

If the gear is put out of action, the pump 6 conveys lubricating oil during the run-down period. When a driving machine 50, for example an electric motor or a turbine, to which the gear is connected is switched off by a control unit 51, the valve 15 is closed by the solenoid 16. Nevertheless, as a result of the volume I, oil can still be fed to the wheel sets 2 and the bearings 5 by way of the pipe 13 until the oil level in the oil reservoir 10 falls to just below the level of the outlet opening into the pipe 13. This level is selected so that even in the event of pump damage sufficient lubricating oil is available during run-down of the gear.

When re-starting the gear a fixed residue amount of oil, namely volume II, is available in the oil reservoir 10 for lubrication of the gear. When the gear is started up, the valve 15 is opened and this oil flows by way of the pipe 14 to the bearings 5. The start-up of the gear may, in fact, be delayed until after the valve 15 in the pipe 14 has been opened with the aid of the solenoid 16. This is accomplished by use of an optional time relay 52. The overflow pipe 12 simply allows for overflow or venting of the oil from the reservoir 10. With rising gear speed, the pump 6 takes over the function of supplying lubricant and once the second oil reservoir 10 is completely filled, the oil overflows through the pipe 12. In this respect, a slight amount of oil is lost, although it can be used for lubrication of the toothed wheels 2.

Oil flowing back into the main oil reservoir 7 at the bottom of the gear housing 1 is cooled down again by variable cooling elements 19. It is envisaged that the gears forming part of the installation function as part of a pumping mechanism which is run at constant power. In this respect it is desirable that the gear should operate at constant temperature, and to achieve this the cooling surface has to be coordinated appropriately to the desired rate of cooling (i.e. heat loss). The required cooling surface is dependent upon installation conditions, gear power throughput and so forth. In the case of series gears experiments may be carried out to determine the optimum design of the cooling surfaces. If, however, single-piece gears are produced for different applications, adaptation at the place of operation, i.e. in the installed gear, is the only feasible way of determining optimum cooling surfaces. For this reason the cooling elements 19 are designed as ribs which can be screwed or bolted onto the housing. The dimensions of the ribs may be determined appropriately from case to case.

Another embodiment, which is not shown in detail, comprises a gear housing having integrally cast cooling ribs which can be coordinated by removing selected ribs with the aid of predetermined separation points.

Figure 2:
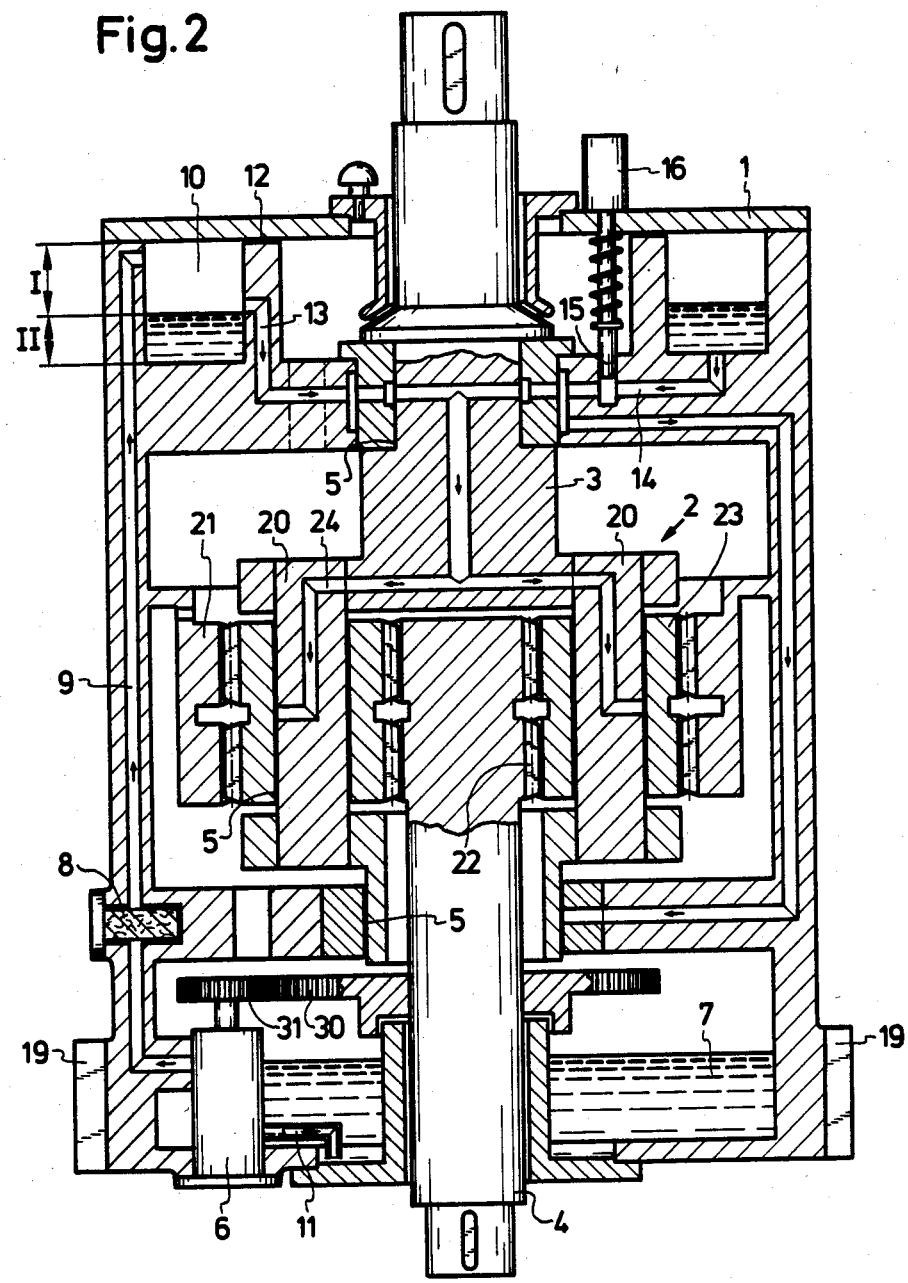
FIG. 2 is a similar view of a second embodiment of the invention which includes a planet wheel gear.

The second embodiment of the gear installation of the invention, as shown in FIG. 2, includes a vertical planetary wheel gear consisting of an outer wheel 21, an inner or central wheel 22, a planet wheel carrier 20 and planet wheels 23 arranged on the carrier 20. The planet wheel carrier 20 has oil supply pipes 24 which are connected to the pipes 13 and 14 leading from the second oil reservoir 10.

In this case, the second oil reservoir 10 is annular and again lies in the upper region of the gear housing 1. Again, the outlet opening to the pipe 14 lies below the outlet opening to the pipe 13, so that, just as in the embodiment of FIG. 1, two substantially equal oil supply volumes I and II are provided. Volume I serves for lubrication during the shut-down of the gear, whereas volume II serves for lubrication during the start-up procedure. The oil flows by way of the pipes 13 and 14 to all the lubrication points 5 of the gear. The oil pump 6 is driven by way of a toothed wheel set 30, 31 from the shaft 4 and an overflow and ventilation pipe 12 is also provided.

Figure 3:
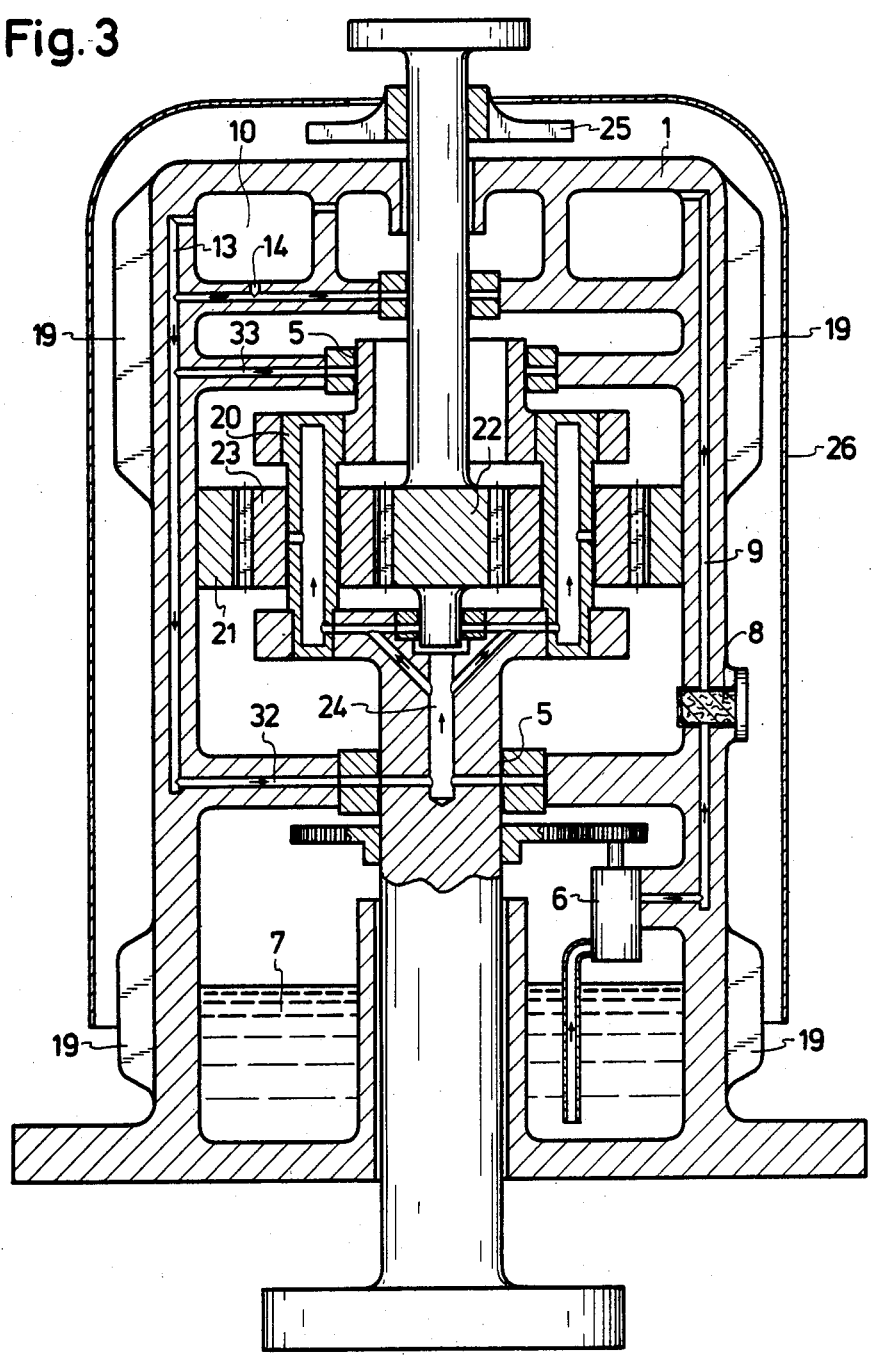
FIG. 3 is a similar view of a third embodiment of the gear installation of the invention which also includes a planetary gear.

The third embodiment of gear installation of the invention, as shown in FIG. 3, also has a vertically-arranged planetary gear. In this case the second oil reservoir 10 in the upper region of the gear housing 1 is again annular is design and, by way of the pipes 13, 14, supplies the corresponding bearings 5. The bearings 5 of the planet wheel carrier are supplied from the pipes 13, 14 by way of the pipes 32, 33 whereas the bearings of the planet wheels 23 are supplied by way of the pipes 32 and 24.

In this embodiment, a cooling ventilator 25 is arranged outside the upper region of the gear housing and the ventilator 25 is surrounded by an air circulation hood 26. Cooling ribs 19 are again provided, so that adequate cooling of the oil inside the housing 1 is also ensured by the aforesaid construction.

The rate of cooling (cooling performance) may be varied by adjusting or altering the precise configuration of the ventilator 25 and/or the air circulation hood 26.

Figure 4:
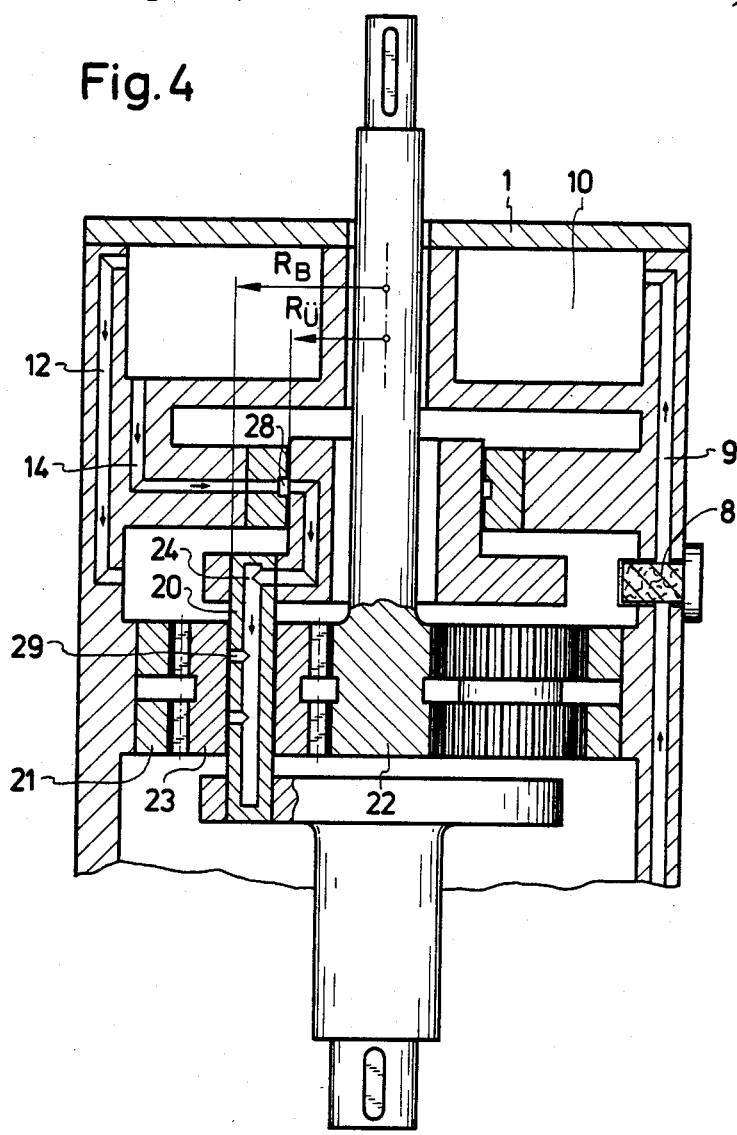
FIG. 4 is a similar view of a fourth embodiment of the gear installation of the invention, also including a planetary gear.

In the fourth embodiment, shown in FIG. 4, two pipes are again provided to supply the appropriate bearings with oil although only pipe 14 is shown. The planet wheel carrier 20 is supplied from these pipes by way of the oil supply pipes 24. The pipe 12 serves again as overflow and for ventilation.

Figure 5:
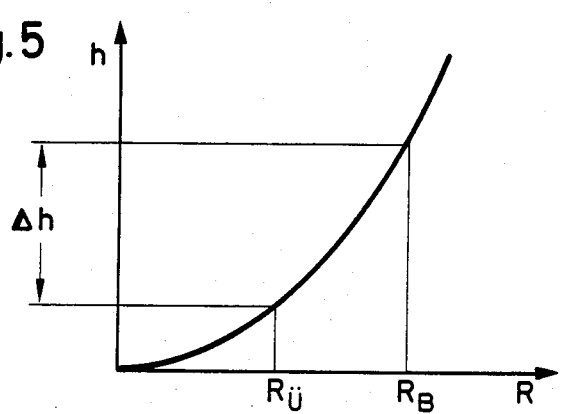
FIG. 5 is a graphic representation of the effect on the oil supply of the device shown in FIG. 4.

This construction is so designed that an inlet opening 28 into the planet wheel carrier 20 has a radius $R_Ü$ with regard to the gear central axis, whereas an outlet opening 29 in the region of the bearing of the planet wheels 23 has a radius $R_B$ with regard to the gear central axis. As a result of this difference between $R_B$ and $R_Ü$ there is, in accordance with FIG. 5, a pressure difference $\Delta h$ whenever the gear is running. Thus, in this case, centrifugal force is utilized to supply the bearings of the planet wheels 23 with oil.

With appropriate formation of the openings 28 and 29 and of the pipe 24, oil emerges at the high pressure point $R_B$, whereas oil is sucked in at the radius $R_Ü$. This effect leads to the sucking in of oil from the oil reservoirs. Thus, even in the event of a long run-down period, oil supply to the bearings of the planet wheels 23 is ensured. In this construction the valve 15 is not necessarily required, but in such a case the start-up period would not be protected. If, in the case of this type of construction, fairly long periods of disuse are intended, the control valve 15 must be incorporated into the pipe 14, just as in the embodiments of FIGS. 1 to 3.

The invention provides a compact gear installation in which all the necessary auxiliary equipment for pressure lubrication is accommodated in the gear housing 1. The second oil reservoir 10 guarantees a damage-free start-up and/or run-down of the gear located in the gear housing 1. Supply of oil to the bearings etc., is solved in a simple manner, as is adjustment of the operating temperature.

The gear installation of the invention may advantageously be used in workshops which have high safety requirements, yet wish at the same time to minimise installation of safety apparatus. Fields of application are, for example, the chemical nuclear power industries.

However, the invention may also be applied to general mountings such as the mounting of shafts in bearing blocks.

What we claim is:
1. A gear installation comprising:
a gear housing;
a gear located within said housing;
drive means located outside said housing for operatively driving said gear;
control means for selectively switching said drive means on and off;
a first oil reservoir located in a lower region of said housing beneath said gear;
a second oil reservoir located in an upper region of said housing above said gear;
a duct connecting said first and second oil reservoirs;
a filter disposed in said duct;
an oil pump disposed in said duct and operative to convey oil from said first oil reservoir through said filter to said second oil reservoir;
first and second main pipes which communicate with said second reservoir at respective high and low levels and subsequently communicate with each other to supply oil to said gear; and
sealing means responsive to said control means for permitting and obstructing fluid flow through said second main pipe when said drive means is respectively switched on and switched off by said control means.

2. A gear installation as set forth in claim 1, wherein an overflow pipe leads from an upper region of said second oil reservoir to said gear, said overflow pipe communicating with said second reservoir at a level spaced above said high level at which said first main pipe communicates with said second reservoir.

3. A gear installation as set forth in claim 1, wherein said sealing means includes a valve, and includes a solenoid which is actuated by said control means to operate said valve.

4. A gear installation as set forth in claim 3, including a time relay which is connected between said control means and said drive means.

5. A gear installation as set forth in claim 1, wherein said gear is a part of a planetary gear mechanism having a planetary wheel carrier and wherein oil supply pipes supplying oil to said carrier communicate with said first and second main pipes.

6. A gear installation as set forth in claim 1, wherein cooling elements in the form of removable screw-on ribs are provided on the outside of said gear housing.

7. A gear installation as set forth in claim 1, wherein said gear housing is formed with integral external ribs which serve as cooling elements.

8. A gear installation as set forth in claim 1, wherein a cooling ventilator is provided outside said gear housing and wherein at least a portion of said housing is disposed within an air circulation hood, said cooling ventilator causing air to flow through said hood and across external surfaces of said housing.

9. A gear installation as set forth in claim 1, wherein said first main pipe communicates with said second reservoir at a vertical level approximately intermediate upper and lower ends of said second oil reservoir.

10. A gear system as set forth in claim 1, wherein said gear is a part of a planetary gearing mechanism which includes a planetary gear carrier supported for rotation about a center axis and a planet wheel rotatably supported on said carrier, said carrier having an oil supply line therein which has an inlet opening to which oil from at least one of said main pipes is supplied and which has an outlet opening through which oil is supplied to said planet wheel, said inlet opening being radially closer to said center axis than said outlet opening.

11. A gear installation, comprising: a gear; means for rotatably supporting said gear; drive means for rotationally driving said gear; control means for selectively actuating and deactuating said drive means; a lower oil reservoir at a location vertically lower than said gear; an upper oil reservoir at a location vertically higher than said gear; pump means for supplying oil from said lower oil reservoir to said upper oil reservoir when said drive means is effecting rotation of said gear; means for supplying oil from said upper reservoir to said gear, including first and second conduits which each communicate with said upper reservoir, said first conduit communicating with said upper reservoir at a location vertically higher than a location at which said second conduit communicates with said upper reservoir; means for causing oil supplied to said gear to thereafter flow back into said lower reservoir; and valve means responsive to said control means for obstructing fluid flow through said second conduit when said drive means has been deactuated by said control means.

12. The gear installation according to claim 11, wherein said pump means supplies oil to said upper reservoir faster than oil can flow out of said upper reservoir through said first and second conduits, and including an overflow conduit communicating with said upper reservoir at a location vertically higher than the location at which said first conduit communicates therewith, oil flowing into said overflow conduit being delivered to said lower reservoir.

13. The gear installation according to claim 11, wherein said valve means includes a normally closed valve which obstructs fluid flow through said second conduit when closed, and includes an electrically actuable solenoid which is operatively coupled to said valve and opens said valve when electrically actuated, said solenoid having input terminals which are electrically coupled to said control means and said solenoid being electrically actuated and deactuated by said control means.

14. The gear installation according to claim 11, wherein said drive means includes time relay means for delaying the start of rotation of said gear for a predetermined interval of time after said control means actuates said drive means.

15. The gear installation according to claim 11, wherein said pump means is operatively driven by said drive means.

16. The gear apparatus according to claim 11, including filter means for filtering oil supplied by said pump means to said upper reservoir, cooling means for cooling oil in said lower reservoir, and a substantially closed housing, said gear being rotatably supported in said housing and said housing having therein said upper and lower reservoirs, said pump means and said first and second conduits.

17. The gear apparatus according to claim 11, wherein said gear is a part of a planetary gear mechanism which includes a planetary gear carrier supplied for rotation about a center axis and a planet wheel rotatably supported on said carrier, said carrier having an oil supply passage therein which has an inlet opening and which has an outlet opening through which oil is supplied to said planet wheel, said inlet opening being radially closer to said center axis than said outlet opening, and including means for supplying oil from said first and second conduits to said inlet opening of said oil supply passage in said carrier.

* * * * *

UNITED STATES PATENT AND TRADEMARK OFFICE
CERTIFICATE OF CORRECTION

PATENT NO. : 4 658 665

DATED : April 21, 1987

INVENTOR(S) : Horst STRINZEL et al

It is certified that error appears in the above-identified patent and that said Letters Patent is hereby corrected as shown below:

Column 8, Line 19; Change "supplied" to ---supported---

Signed and Sealed this

First Day of September, 1987

*Attest:*

DONALD J. QUIGG

*Attesting Officer*    *Commissioner of Patents and Trademarks*